United States Patent
Chen et al.

(10) Patent No.: US 9,301,454 B2
(45) Date of Patent: Apr. 5, 2016

(54) WETTABLE, NON-LEACHABLE PEAT MOSS, METHOD OF PREPARATION, AND METHOD OF USE

(75) Inventors: Zhiyun Chen, Jersey City, NJ (US); Jean-Christophe Castaing, Sèvres (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 13/569,637

(22) Filed: Aug. 8, 2012

(65) Prior Publication Data

US 2013/0036668 A1 Feb. 14, 2013

Related U.S. Application Data

(60) Provisional application No. 61/521,509, filed on Aug. 9, 2011.

(51) Int. Cl.
| | |
|---|---|
| *A01G 31/00* | (2006.01) |
| *A01G 9/10* | (2006.01) |
| *C08L 1/02* | (2006.01) |
| *C08L 1/28* | (2006.01) |
| *C08L 3/04* | (2006.01) |
| *C08L 5/00* | (2006.01) |
| *C08L 5/08* | (2006.01) |
| *C08L 97/00* | (2006.01) |

(52) U.S. Cl.
CPC .............. *A01G 9/1086* (2013.01); *A01G 31/00* (2013.01); *A01G 31/001* (2013.01); *C08L 1/02* (2013.01); *C08L 1/284* (2013.01); *C08L 3/04* (2013.01); *C08L 5/00* (2013.01); *C08L 5/08* (2013.01); *C08L 97/002* (2013.01)

(58) Field of Classification Search
CPC .... A01G 9/1086; A01G 31/001; A01G 31/00
USPC ..................................... 47/59 S, 58.1 R, 59 R
See application file for complete search history.

(56) References Cited

U.S. PATENT DOCUMENTS

| | | | | |
|---|---|---|---|---|
| 4,337,594 | A * | 7/1982 | Hanacek et al. ................. 47/1.1 |
| 4,589,225 | A * | 5/1986 | Stensaas ..................... 47/58.1 R |
| 5,441,877 | A * | 8/1995 | Chiaffredo et al. ........... 435/176 |
| 5,801,116 | A | 9/1998 | Cottrell et al. |
| 7,472,661 | B2 * | 1/2009 | Hull et al. ...................... 111/200 |
| 2009/0265980 | A1 * | 10/2009 | Spittle et al. ......................... 47/9 |
| 2010/0050512 | A1 * | 3/2010 | Stark et al. .................. 47/1.1 R |
| 2010/0229465 | A1 * | 9/2010 | Ahm et al. |
| 2011/0185456 | A1 * | 7/2011 | Cheikh et al. ................. 800/312 |

FOREIGN PATENT DOCUMENTS

| | | |
|---|---|---|
| JP | 06-153695 A | 6/1994 |
| JP | 10-248377 A | 8/1998 |
| WO | 00-21581 A1 | 4/2000 |

OTHER PUBLICATIONS

International Search Report and Written Opinion by KIPO on Feb. 21, 2013.

* cited by examiner

*Primary Examiner* — Son T Nguyen

(57) ABSTRACT

A peat moss composition having improved water holding capacity, hydrophilicity, and/or anti-leaching properties comprising one or more polysaccharides, for example guars and/or guar derivatives, is disclosed. A method of preparing the peat moss composition and a method of using it are also disclosed.

5 Claims, 4 Drawing Sheets

1 is Commercial
2 is a control test treated with water
3 is guar 1

1 is Commercial
2 is a control test treated with water
3 is guar 1

WETTABLE, NON-LEACHABLE PEAT MOSS, METHOD OF PREPARATION, AND METHOD OF USE

CROSS REFERENCE TO RELATED APPLICATIONS

This application claims the benefit of U.S. Provisional Application No. 61/521,509, filed on Aug. 9, 2011, hereby incorporated by reference.

BACKGROUND OF THE INVENTION

This invention relates to the field of peat moss, more particularly to improving the wettability of peat moss.

According to the current state of the art, surfactants are used commonly as wetting agents in the peat moss industry. For example, in U.S. Pat. No. 5,867,937, Templeton describes the use of EO-PO polymers and silica to relieve hydrophobicity of peat moss, bark, and rockwool in soilless mixes used for plant growth, promoting easier, faster, and more even watering of such mixes without plant injury. Hagen, et al., U.S. Pat. No. 6,455,149, describes water swellable peat pellets including peat moss, a pH adjusting agent, a wetting agent, and an optional processing additive with a preferred bulk density of about 300 to about 600 kg/m$^3$. The wetting agent can be nonionic surfactants such as copolymerized alkane oxides, for example ethylene oxide-propylene oxide copolymers (EO-PO). Outside of the field of peat moss, various soil additives have been used and proposed to prevent evaporation, promote seed germination, and reduce drainage, for example PCT/CN2011/073298 filed Apr. 26, 2011 describes introducing a bulk additive such as guars, unwashed or washed guar gum or polymers such as polyacrylamide and poly(meth)acrylic acid to a target soil area and contacting a top layer of the target soil area with a surface additive.

We have found that use of surfactants such as EO-PO copolymers with silica and other alkane oxide copolymers does improve the hydrophilicity of peat moss but they do not sufficiently improve the ability of the peat moss to resist leaching.

SUMMARY OF THE INVENTION

It is an object of the present invention to improve peat moss with regard to water holding capacity, hydrophilicity, and ability to resist leaching.

This object, and others which will become apparent from the following disclosure, are achieved by the present invention which comprises in one aspect a composition comprising peat moss and one or more polysaccharides.

In some embodiments the polysaccharide(s) is a guar and/or guar derivative (collectively referred to herein as "guar").

In another aspect, the invention comprises a method of improving the water holding capacity, hydrophilicity, and/or ability to resist leaching of peat moss comprising the step of adding one or more polysacharides.

Another aspect of the invention comprises a method of horticulture comprising planting a seed or plant which requires water and a nutrient in a composition comprising peat moss which comprises such a nutrient and one or more polysacharides.

DETAILED DESCRIPTION OF THE INVENTION

Figure 1:
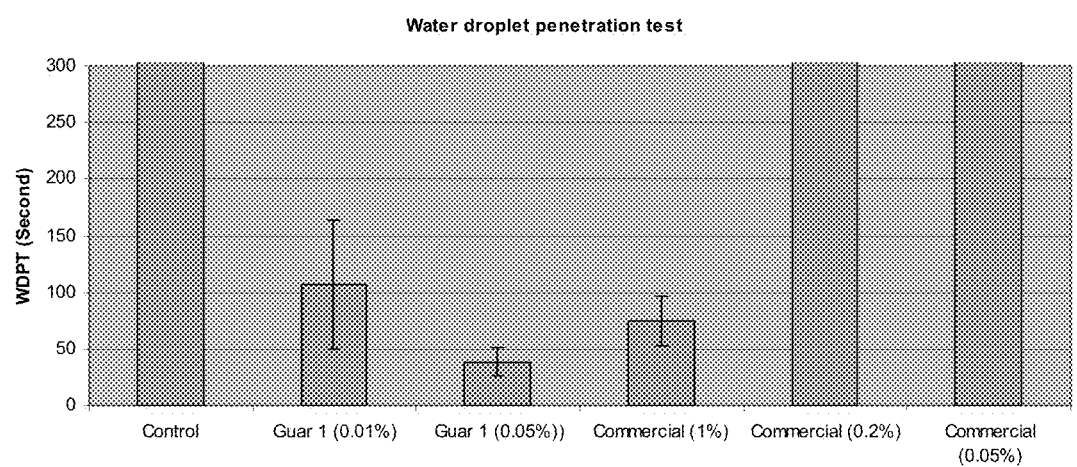
FIG. 1 is a chart showing the results of a water droplet penetration test.

The term "peat moss" refers generally to large absorbent moss (genus *Sphagnum*, family Sphagnaceae) that grows in dense masses on boggy ground, where the lower parts decay slowly to form peat deposits. Peat moss is widely used in horticulture, especially for packing plants and for compost. Natural peat moss comprises nutrients which are beneficial to plant growth and preservation but is well known to be hydrophobic and difficult to wet when it is dry.

According to the present invention, varying amounts of one or more polysaccharides are added to peat moss and the resultant composition has the aforementioned improved water holding capacity, hydrophilicity, and/or ability to resist leaching.

Suitable polysaccharides include guar, unwashed guar gum, washed guar gum, cationic guar, carboxymethyl guar (CM guar), hydroxyethyl guar (HE guar), hydroxypropyl guar (HP guar), carboxymethylhydroxypropyl guar (CMHP guar), hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, hydroxypropyl guar hydroxypropyl trimonium chloride, starch, corn, wheat, rice, potato, tapioca, waxy maize, sorghum, waxy sarghum, sago, dextrin, chitin, chitosan, alginate compositions, xanthan gum, carageenan gum, cassia gum, tamarind gum, cationic cellulose, cationic polycarylamide, cationic starch, gum karaya, gum arabic, pectin, cellulose, hydroxycellulose, hydroxyalkyl cellulose, hydroxyethyl cellulose, carboxymethylhydroxyethyl cellulose, hydroxypropyl cellulose, a derivative of any of the foregoing or a combination of any of the foregoing, and the like.

Among the preferred polysaccharides are cationic guars, including synthetic polyacrylamides, polysaccharides such as starch, cellulose, and the like. Cationic hydroxypropyl guar is the presently preferred guar. In one preferred embodiment of cationic hydroxypropyl guar, the cationic degree of substitution (DS) is from about 0.01 to about 3. In another embodiment of cationic hydroxypropyl guar, the cationic DS is from about 0.01 to 1.5. In one preferred embodiment of cationic hydroxypropyl guar, the cationic DS is from about 0.01 to 0.5. In one embodiment, the degree of hydroxyproylation, molecular substitution level (MS) is from about 0.1 to 2, more typically from about 0.1 to 1.

The amount of guar used can vary, however in preferred embodiments the amount used is between 100 and 30,000 parts guar per million (PPM) peat moss, by weight, more preferably between about 500 and 10,000 PPM.

We have discovered that the incorporation of polysaccharides in peat moss significantly decreases the water wetting time in a water droplet penetration time test (WDPT). This wetting benefit in treated peat moss persisted even after several washing processes. The incorporation of guar in peat moss reduced the loss of its essential components in the washing process. Moreover, the treated peat moss had enhanced water holding capacity.

The guar can be incorporated in the peat by a variety of methods, for example by spraying or mixing guar powder, solution, suspension, and/or premix of a controlled concentration on the peat moss substrate involving one or more stationary or mixing steps. The resultant peat moss could be dried or packaged as treated, and then transported to a location where the peat moss is to be applied. The guar can also be applied in situ directly on peat moss substrate at the application location.

The peat moss-guar composition can be used as a substrate or mixed with other components as a mixed substrate in applications such as plant growth, cultivation, and the like.

EXAMPLES

Experiments demonstrating hydrophilizing, anti-leaching, and increasing of water holding capacity (WHC) of peat moss by treating with guar additives were conducted using the following experimental protocols and procedures:

A. Materials: Peat moss: standard brown (Lambert Peat Moss, Inc®); Guar additive (Rhodia 1, cationic modified hydroxypropyl guar, Jaguar brand); Surfactant controls: EO-PO-EO, di-nonyl phenol ethoxylate, de-ionized water (DI water).

B. Apparatus: Tray (44"×24"); Plastic film (Wrap Seal®); Buchner funnel (diameter: 5.5 cm); Two meshes: mesh size—25 and 55 μm; Vacuum flask (2 L) and adaptor; Vacuum gauge: Ashcroft® Low-Vacuum gauge, 30" H2O to 0 and 0 to −7.5 kPa; Lab vacuum or vacuum pump (Interdynamics VCP®-10 Air Conditioning 0.8 CFM Compact Vacuum Pump); Spray bottle: VWR® Adjustable Spray Bottle; Standard lab supplies: spatula, beaker, flask, vial, balance (Denver Instrument®, 0-4000 gram, precision: 0.01 grams), timer; Digital camera (option)

C. Procedure: For guar additive, weight 2.80 g and add to 397.2 mL DI water. Stir overnight. Store stock solution in fridge. Shake well before use. Use it within one week; For surfactant controls, 1% stock solution was prepared by adding 2.0 grams of surfactant into 198 mL DI water; Cover tray with plastic film; Weigh 100 gram peat moss, and spread it evenly on plastic film to create a layer in a thickness of ca. 0.5 cm.; Spray a testing or control solution (total volume of 200 mL) on peat moss with a spray bottle; manually mix peat moss to ensure homogenous wetting; for 1% treatment (other dosage will adjust dilution ratio accordingly); For guar additive, 142.9 mL stock solution was diluted to a total volume of 200 mL.; For surfactant controls, 100 mL stock solution was diluted to a total volume of 200 mL.; Allow the mixture dry under ambient conditions.

D. Hydrophilizing test (capillary rising test): 2.0 gram of peat moss (treated and control) was charged into a 70 mL vial; Slightly tap the vial to ensure a close packing; 30 mL of DI water was added to each vial with the assistance of a spatula to ensure water running down along the wall of vial; Start a timer or image/video capturing with a camera. The time for the fully wetting of peat moss was recorded. The wet peat moss and liquid were saved for next test.

E. Anti-leaching test: A Buchner funnel was equipped with 2 layers of meshes (smaller size mesh was put under the larger one). The weight of the funnel and meshes was recorded. 6 mL water was added to the funnel to wet the mesh. 2.0 gram of fully wet peat moss in 30 mL DI water (from last step) was transferred into the funnel. The filtrate was collected in a vacuum flask equipped with a adaptor. 64 mL DI water was used to rinse the vial. Total volume of water: 100 mL. Low vacuum (800 Pa) was applied to filtration system for 3 minutes. The filtrate was combined and transferred to a 250 mL vial to examine the color of liquid. The peat moss and funnel were saved for next test.

F. WHC test: A vacuum (3000 Pa) was applied to the above funnel for 3 min. The weight of wet peat moss and funnel was recorded. Water retained in peat was calculated by subtraction of the weight of funnel and meshes. Alternatively, the resulting wet peat moss from step 1 was transferred and dried in 105° C. oven until a constant weight was achieved. WHC was calculated accordingly by measuring the weight loss during the drying process of peat moss.

G. Water droplet penetration time (WDPT) test: Add testing material to Petri dish, shake or gently tape the dish to ensure a smooth surface. Deposit a drop of 30 microliter water on the surface, and start the timer simultaneous. Stop the timer when the water drop fully enters the testing material. Record the time. Repeat step 3 and 4 to measure a total of 10 water droplets. Take time average as the WDPT time.

Example 1

Enhanced Wetting

Guar treated peat moss performance test: Water droplet penetration time (WDPT)

|  | Control | Guar 1 (0.05%)* | Guar 1 (0.01%)* | Commercial (1%)** | Commercial (0.2%)** | Commercial (0.05%)** |
|---|---|---|---|---|---|---|
| WDPT (sec.) | >600 | 107 | 39 | 74 | >600 | >600 |

*Guar 1 is cationic hydroxypropyl guar
**"Commercial" is a commercially available EO-PO-EO block copolymer with a MW of ~1500 and 1:1 ratio of EO to PO.

The results of this test are illustrated in the graph of FIG. 1.

Example 2

Durable Treatment

Guar treated peat moss maintained its wettability after washing.

Performance test: Water droplet penetration time (WDPT)

|  |  | Control | Guar 1 (100 ppm)* | Guar 1 (500 ppm)* | Commercial (500 ppm)** |
|---|---|---|---|---|---|
| 0th washing | WDPT (sec) | >600 | 107 | 39 | >600 |
| 1st washing | WDPT (sec) | >600 | 37 | 15 | >600 |
| 2nd washing | WDPT (sec) | >600 | 43 | 10 | >600 |
| 3rd washing | WDPT (sec) | >600 | 84 | 30 | >600 |
| 4th washing | WDPT (sec) | >600 | 36 | 13 | >600 |
| 5th washing | WDPT (sec) | >600 | 53 | 25 | >600 |

-continued

|  |  | Control | Guar 1 (100 ppm)* | Guar 1 (500 ppm)* | Commercial (500 ppm)** |
|---|---|---|---|---|---|
| 6th washing | WDPT (sec) | >600 | 36 | 17 | >600 |
| 7th washing | WDPT (sec) | >600 | 55 | 24 | >600 |

Figure 2:
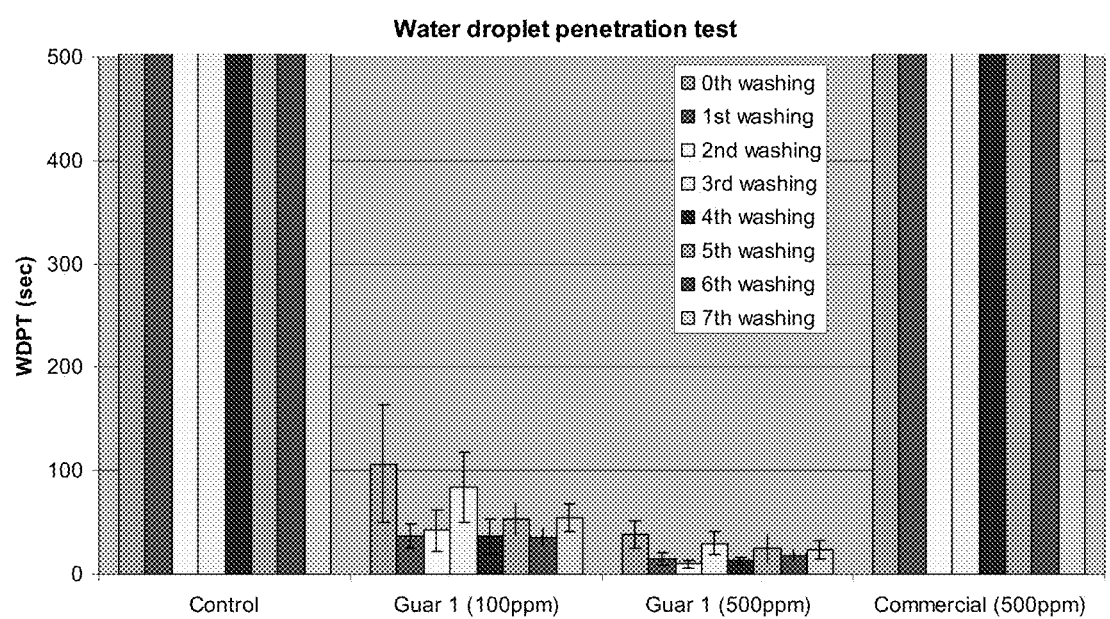
FIG. 2 is a second chart showing the results of a water droplet penetration test.
Figure 3:
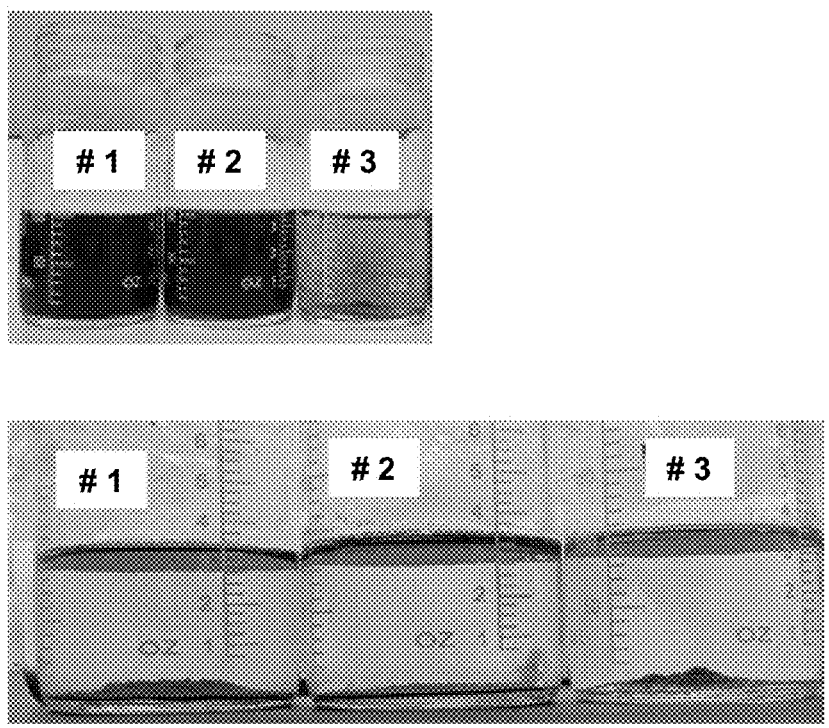
FIG. 3 is a photograph of samples obtained according to the invention and comparative samples.

These results are shown graphically in FIG. 2.

Example 3

Anti-Leaching Performance (Test Detailed in Paragraph [0026])

Gar treated peat moss reduced the leaching of colloidal humic materials that give a dark color to the water that filtrated through the sample.

Example 4

Enhancement of Water Holding Capacity (WHC Test Detailed in Paragraph [0027])

Figure 4:
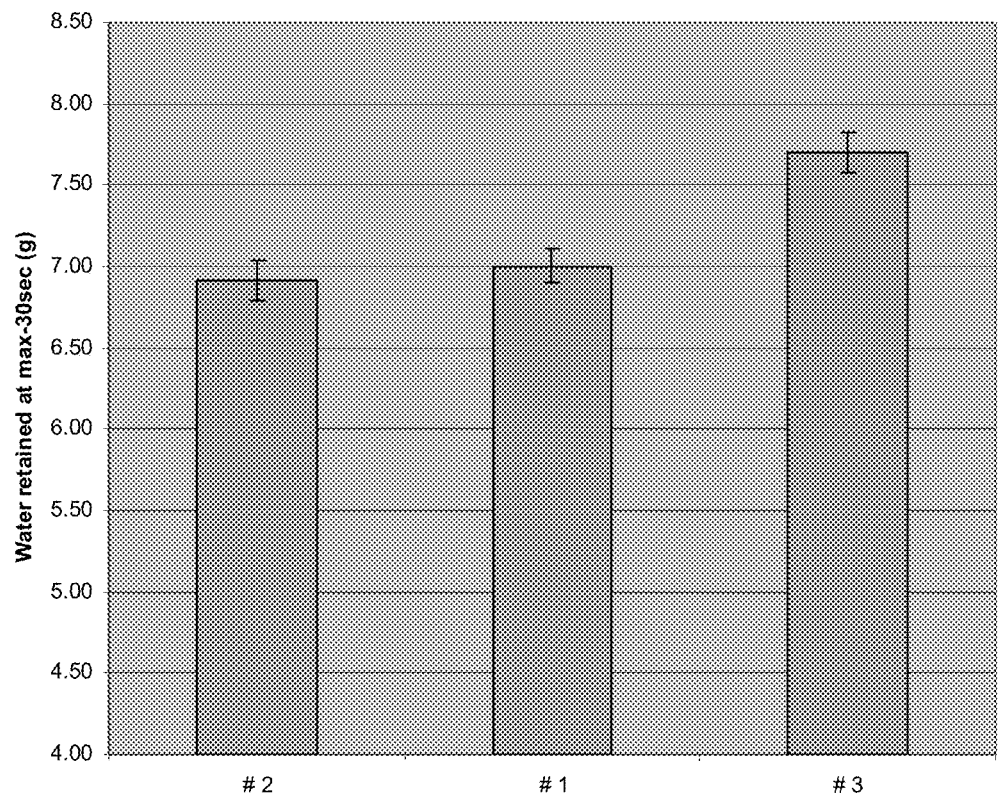
FIG. 4 is a chart showing water retained at max-30 sec (g).

Guar treated peat moss increased the water holding capacity as illustrated by the graph of FIG. 4 showing results of this test.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A composition consisting of peat moss and one or more polysaccharide selected from the group of hydroxypropyl guar (HP guar), cationic hydrophobically modified hydroxypropyl guar (cationic HMHP guar), and hydrophobically modified cationic guar (HM cationic guar).

2. The composition of claim 1 wherein the one or moer polysaccharides comprises about 100 to 30,000 parts per weight per million (PPM) parts by weight peat moss in the composition.

3. The composition of claim 1 wherein the one or more polysaccharides comprises about 500 to 10,000 parts per weight per million (PPM) parts by weight peat moss in the composition.

4. A method of improving the water holding capacity, resistance to leaching of nutrients and/or pesticides from, and/or improving the hydrophilicity of peat moss consisting of incorporating in the peat moss one or more polysachardies selected from the group consisting of hydroxypropyl guar (HP guar), cationic hydrophobically modified hydroxypropyl guar (cationic HMHP guar), and hydrophobically modified cationic guar (HM cationic guar); spraying or mixing a powder, solution, suspension, and/or premix of a controlled concentration of the one or more polysaccharides on or in the peat moss substrate.

5. A method of plant cultivation comprising planting a plant in a peat moss substrate consisting of one or more guars derivatives selected from the group consisting of hydroxypropyl guar (HP guar), cationic hydrophobically modified hydroxypropyl guar (cationic HMHP guar), and hydrophobically modified cationic guar (HM cationic guar) and peat moss.

* * * * *